United States Patent

Suzuki et al.

[11] Patent Number: 5,291,131
[45] Date of Patent: Mar. 1, 1994

[54] APPARATUS FOR MEASURING ELONGATION OF A CIRCULATING CHAIN

[75] Inventors: Kenshi Suzuki, Takatsuki; Takerou Nakagawa, Osaka; Sachihiko Maeda, Hirakata, all of Japan

[73] Assignee: Tsubakimoto Chain Co., Osaka, Japan

[21] Appl. No.: 30,833

[22] Filed: Mar. 12, 1993

[30] Foreign Application Priority Data

Mar. 31, 1992 [JP] Japan .................................. 4-026547

[51] Int. Cl.⁵ .................................................. G01B 7/04
[52] U.S. Cl. .................................................. 324/206
[58] Field of Search .............. 73/432.1, 828; 33/732, 33/751, 712; 198/810; 324/172, 207.25, 207.22, 206; 356/32, 383; 250/559; 116/208, 212, 278

[56] References Cited

U.S. PATENT DOCUMENTS

| | | | |
|---|---|---|---|
| 2,332,573 | 10/1943 | Hibschman et al. | 324/172 |
| 2,989,690 | 6/1961 | Cook | 324/206 |
| 3,832,064 | 8/1974 | Horst et al. | 250/559 |
| 4,106,005 | 8/1978 | Asakawa | 324/206 |
| 4,782,294 | 11/1988 | Libert et al. | 324/206 |
| 5,003,913 | 4/1991 | Jensen | 116/208 |

FOREIGN PATENT DOCUMENTS

| | | | |
|---|---|---|---|
| 0014005 | 1/1983 | Japan | 356/383 |
| 0077607 | 5/1983 | Japan | 356/383 |

*Primary Examiner*—Robert Raevis
*Attorney, Agent, or Firm*—Howson and Howson

[57] ABSTRACT

Elongation of a moving endless body, such as a chain, a belt, a conveyor or the like, is measured continuously by providing two indices, e.g. pins or tongues, on the endless body, and two sensors, e.g. magnetic or optical sensors, along the path of circulating movement of the endless body. The sensors are connected to an arithmetic circuit which determines elongation from the data provided by the sensors.

3 Claims, 3 Drawing Sheets

APPARATUS FOR MEASURING ELONGATION OF A CIRCULATING CHAIN

BRIEF SUMMARY OF THE INVENTION

This invention relates to an apparatus for measuring the elongation of an endless moving body such as a chain or belt, while the endless body is moving in a circulating path.

For example, in the case of a chain, elongation is unavoidable because the pins and bushings by which the elements of the chain are connected together are subject to wear. Elongation of a chain impairs the smooth transfer of power. Therefore, in the design and development of chains, it is necessary to measure elongation resulting from actual operation of the chain. The information obtained by measurement of elongation is used as data for future design and development.

In the past, measurement of a chain elongation has been conducted by an inspector in the following procedure. First, with the loop of the chain opened so that the chain can be stretched in a straight line, the chain is placed on a measurement table and one end thereof is fixed by attachment to a fixture. A predetermined load is then applied to the other end of the chain to apply tension to the chain, and the overall length of the chain is measured. Thereafter, the chain is formed into a closed loop, entrained about a set of sprockets, and moved about the sprockets in a circulating path for a predetermined time. After the predetermined time has elapsed, the chain is disengaged from the sprockets, and the loop is opened once again by pulling out a pin. With the chain once again in a rectilinear state and on the measurement table, one end is fixed, and a predetermined load is applied to the other end. The overall length of the chain is measured once again, and the difference between the presently measured length and the previously measured length is calculated. This difference corresponds to an elongation of the chain. The same operations are repeated at regular intervals to record the elongation of the chain.

Measurement of chain elongation using the above process entails a number of problems.

First, the process requires a large amount of time and labor, particularly because of the need for pulling out and inserting a pin in the chain, and the need for repeated removal and mounting of the chain with respect to the sprockets.

Variations in measurement data are apt to occur due to changes in the test environment, including variations in the temperature of the chain and variations in the extent of pervasion of lubricating oil in the chain.

It is impossible to obtain continuous data because the chain is disengaged from the sprockets for every measurement. This makes it particularly difficult to make an adequate record of the large elongation which typically occurs over a short interval of time as a result of wear occurring during the initial usage of the chain.

The objects of the invention include the reduction of the time and labor required to measure elongation of a chain or other endless moving body, the improvement in the accuracy of elongation measurement, and the provision of an apparatus capable of making a substantially continuous record of elongation. The invention addresses the above objects by providing a pair of indices on the endless moving body. These indices are spaced from each other in the direction of circulating movement of the endless body. A pair of sensors are disposed at predetermined positions along the path of circulation of the endless body and spaced from each other in the direction of the path. The sensors detect the indices as they pass the predetermined positions. A calculating means is provided for arithmetically determining elongation of said endless body on the basis of the distance between the sensors and the time required for each of said indices to pass both of the sensors.

In the operation of the apparatus, the circulating speed of the moving body is calculated on the basis of the time required for a first one of the two indices to pass both of the sensors and a previously determined distance between the two sensors. Next, the distance between the two indices is calculated on the basis of the calculated speed of the moving body and the time which elapses from when a first index passed a first sensor until when a second index passed the first sensor. The above procedure to determine the distance between the two indices on the chain is repeated at regular intervals. The amount of elongation of the moving body point is determined by observing the changes in the index-to-index distance over time. Thus, the extent of elongation of the body from the time when it is new can be determined by calculating the difference between the initially measured index-to-index distance and the current index-to-index distance. Furthermore, the elongation of the body over time can be recorded substantially continuously.

The endless moving body can be circulated continuously over the entire measurement interval, while the calculations are performed repeatedly by the arithmetic calculating means.

Further objects, details and advantages of the invention will be apparent from the following detailed description, when read in conjunction with the drawings.

DETAILED DESCRIPTION

Figure 1:
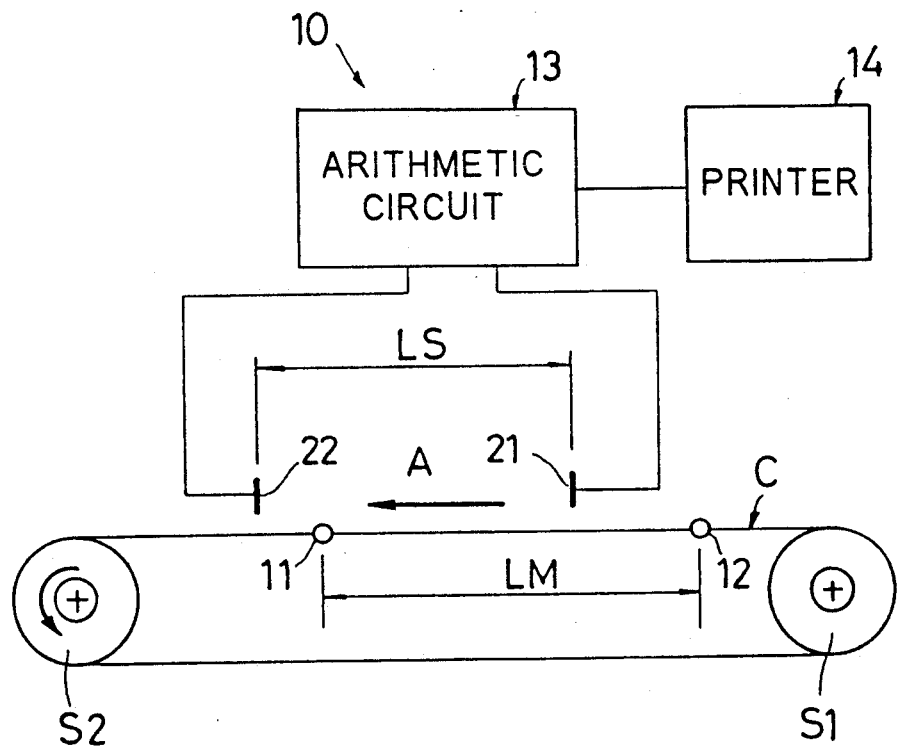
FIG. 1 is a schematic diagram showing an elongation measuring apparatus according to the invention.

Referring to FIG. 1, an elongation measuring apparatus 10 is provided for measuring the elongation of a chain C which is moving in a circulating path about sprockets S1 and S2 in the direction of arrow A.

The chain is provided with a pair of indices 11 and 12, and adjacent to the path of the chain, there is provided a pair of sensors 21 and 22, connected to an arithmetic circuit 13 and a printer 14.

The indices 11 and 12 on chain C are spaced from each other in the direction of circulation of the chain. The indices 11 and 12 are disposed at both ends of a section of chain the elongation of which is to be measured.

Figure 2:
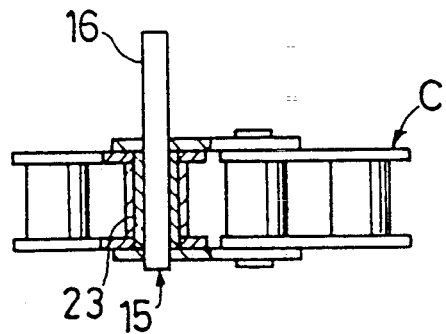
FIG. 2 is a partially cut away plan view of a chain showing a pin used as an index for detection by a sensor.
Figure 3:
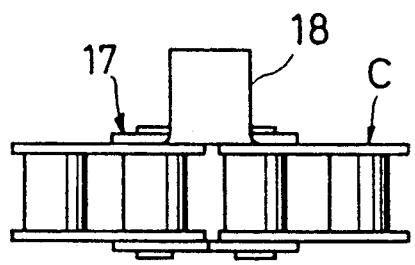
FIG. 3 is a plan view of the chain having an alternative form of index.
Figure 4:
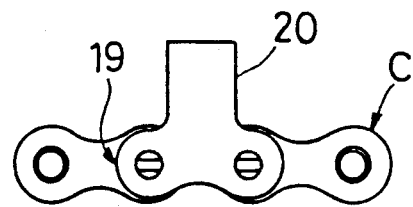
FIG. 4 is a side elevation of view of a chain having still another alternative form of index.

The indices can take various forms. For example, in FIG. 2, an index consists of a projecting portion 16 of a pin 15 extending through a bushing 23 in chain C. Alternatively, as shown in FIG. 3, the index can be a tongue 18 projecting laterally from a side face of an outer link plate 17 of the chain. As shown in FIG. 4, the index can also be in the form of a tongue 20 of a specially formed outer link plate 19, the tongue extending in the direction of the planar surface of the link plate.

Returning to FIG. 1, the sensors 21 and 22 are positioned along the path of circulating movement of the chain in close proximity to the paths of pins 16, tongues 18 or tongues 20.

The sensors can take various forms. For example the sensors can be photosensors or magnetic sensors.

Where photosensors are used, each index can be a light-reflecting silver paper or a thin metallic sheet having a polished surface secured to a side face of an outer link plate. Thus, when photosensors are used as the sensing elements, it is not necessary to provide the chain with a special pin or a specially fabricated link plate having a tongue.

The sensors 21 and 22 are disposed along a rectilinear portion of the chain C, and are spaced from each other in the direction of circulating movement of the chain. They are connected to an arithmetic circuit 13. The spacing LS between the first sensor 21 and the second sensor 22, and the spacing LM between the first and second indices 11 and 12, are approximately the same.

The arithmetic circuit 13 calculates the elongation of chain C on the basis of the distance LS between the sensors 21 and 22, and the times required time for each of indices 11 and 12 to pass from 21 to sensor 22. The arithmetic circuit 13 can comprise a microcomputer of a conventional type. Microcomputers capable of performing the operations here required are well known, and the design of program for carrying out the necessary calculations is well within the capabilities of persons having ordinary skill in the art. Accordingly, detail of the arithmetic circuit and its operating program are omitted here.

The arithmetic circuit 13 is connected to a printer 14 which prints the data calculated by the arithmetic circuit. Instead of a printer, a display may be used.

In the operation of the apparatus, during its circulating movement, chain C undergoes elongation due to the wearing of its pins and their bushings. Sensors 21 and 22 detect the passage of indices 11 and 12 in front of them.

To understand the manner in which the elongation is determined, it may be assumed that the time at which the first sensor 21 detects the first index 11 is t1; that the time at which the second sensor 22 detects the first index 11 is t2; that the time at which the first sensor 21 detects the second index is t3; and that the time at which the second sensor 22 detects the second index 12 is t4. Time t1 may be taken as a reference, i.e. t1=0. Further, the detection of time is preferably performed by counting pulses generated at a known rate by a clock pulse generator.

For example, the detection of time t2 is conducted by counting the number of pulses from the time at which the first index 11 passes the first sensor 21 until the time at which the first index 11 passes the second sensor 22.

Next, the elongation arithmetic circuit 13 calculates the time $T1=(t2-t1)$ required for the first index 11 to pass the first and second sensors 21 and 22, are the time $T2=(t4-t3)$ required for the second index 12 to pass the first and second indices 21 and 22.

The arithmetic circuit 13 also calculates speeds V1 and V2 of indices 11 and 12 respectively. Speeds V1 and V2 are calculated on the basis of both times T1 and T2 and the distance LS between the two sensors, which is accurately measured beforehand. That is, $V1=(LS/T1)$, and $V2=(LS/T2)$.

Since indices 11 and 12 are provided on the same chain C, theoretically V1 and V2, the moving speeds of indices are equal to the moving speed of the chain C and to each other. Actually, however, a measurement error occurs for several reasons, including unevenness in the rotation of sprockets S1 and S2, and vibration of the chain. Therefore V1 is not always equal to V2.

To minimize measurement errors, a mean value of the two velocities, $V3=(V1+V2)/2$, is calculated and is used as the estimated speed of the chain C.

Since the spacing LS between sensors 21 and 22 expands and contracts with changes in temperature, the value of LS is corrected for temperature automatically by a temperature compensator in the arithmetic circuit 13.

The arithmetic circuit 13 calculates the elapsed time $T3=(t3-t1)$ from the time at which the first index 11 passes the first sensor 21 until the time at which the second index 12 passes the first sensor. It also calculates the elapsed time $T4=(t4-t2)$ from the time at which the first index passes the second sensor 22 until the time at which the second index passes the second sensor.

Arithmetic circuit 13 then calculates a distance $LM1=(T3 \cdot V3)$, between the first index 11 and the second index 12, from the elapsed time T3 and the estimated chain circulation speed V3. Similarly, it calculates a distance $LM2=(T4 \cdot V3)$, between the first index 11 and the second index 12, from the elapsed time T4 and the estimated chain circulation speed V3.

Theoretically, LM1 is equal to LM2, because the paired indices 11 and 12 are provided on the same chain C, but in practice a measurement error occurs due to various causes, including unevenness in the rotation of sprockets S1 and S2 and vibration of the chain. Thus, LM1 is not always equal to LM2.

To minimizing the measurement error, a mean value, $LM3=(LM1+LM2)/2$, is calculated and is assumed to be the distance between the paired indices.

The above procedure is repeated periodically to determine the distance between the paired indices, and the elongation of chain C from its initial length is traced on the basis of the differences between successive measurements of the index-to-index distance.

Data relating to the length and elongation of chain C are printed out by means of printer 14.

Figure 5:
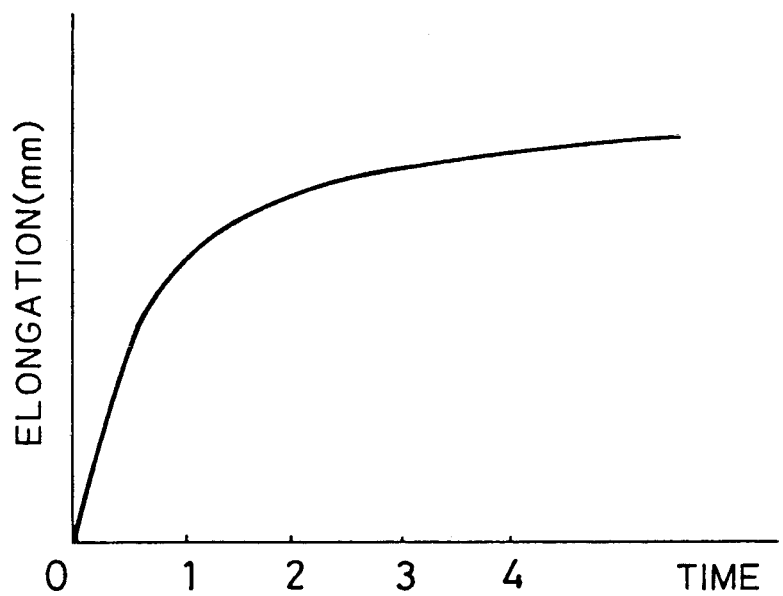
FIG. 5 is a plot of typical data obtained by the elongation measuring apparatus of the invention.

For example, as shown in FIG. 5, the data are printed as a graph showing the elongation of chain C over time. In the graph, the initial length of the chain is assumed to be zero.

The measuring apparatus of the invention is particularly effective in the measurement of elongation of belts which cannot be cut for the purpose of elongation measurement. In the case of a belt, elongation develops by a secular change of the material of the belt, which is typically rubber or fiber.

The invention is also particularly effective in the measurement of elongation of heavy conveyors, which require a great deal of time and labor at the time of removal from sprockets and remounting.

In accordance with the invention, elongation of an endless moving body can be measured while the body is in motion. Therefore, it is no longer necessary to disengage the body from its drive mechanism (e.g. sprockets or pulleys) for each measurement, and consequently measuring efficiency is greatly improved.

Since the measurement of elongation can be carried out while the body is in motion, it is possible to effect measurement while the test environment, including the temperature and the extent of pervasion of lubricating oil, is maintained in a constant state. Therefore, it is possible to minimize factors which cause variations in measurement data.

Continuous elongation data can be obtained because it is not necessary to remove the endless body from its drive mechanism. In particular, the large elongation which occurs in the initial operation of the endless body can be measured continuously over time.

With the apparatus of this invention, it is possible to automate the measurement so that one inspector can handle several elongation measurements being carried out simultaneously.

Since measured values can be obtained continuously, the occurrence of any trouble in the endless moving body under test can be determined from the measured values, and it is possible to stop the measuring apparatus quickly when such trouble occurs.

Various modifications can be made to the apparatus described.

In the above-described embodiment a mean value of the first and second index speeds V1 and V2 is used as the circulating speed of chain C in order to minimize the measurement errors caused by unevenness in the rotation of the sprockets, vibration of the chain, etc. However, when unevenness in sprocket rotation and chain vibration are small and their influence on measured values is within an allowable range, the moving speed V1 of the first index, or the moving speed V2 of the second index, may be used by itself as representing the moving speed of chain C. Also either the distance LM1 or the distance LM2 can be used alone as the index-to-index distance.

Further, although the above-described embodiment relates to the measurement of elongation of a chain, the invention is also applicable to measurement of the elongation of other endless circulating objects such as belts and conveyors.

Still other modifications can be made without departing from the scope of the invention as defined in the following claims.

We claim:

1. In an apparatus comprising a chain, configured in a closed loop and arranged to move in a circulating path, a device for measuring the elongation of the chain comprising:

means providing a pair of indices on the chain, said indices being spaced from each other in the direction of circulating movement of the chain in said circulating path;

means, comprising a pair of sensors, disposed at predetermined positions along said circulating path and spaced from each other in the direction of said path, for detecting said indices and producing signals as the indices pass said predetermined positions; and calculating means, responsive to said signals produced by the sensors, for arithmetically determining elongation of said chain on the basis of the distance between said sensors and the time required for each of said indices to pass both of said sensors;

wherein said chain comprises link plates extending in the direction of said circulating path and means, comprising pins extending transverse to the direction of said circulating path, for connecting said link plates together; and wherein said indices are constituted by elements from the group consisting of tongues formed on two selected link plates of the chain, and projecting portions, provided on two selected ones of said pins.

2. An apparatus according to claim 1 wherein said indices are constituted by tongues formed on two selected link plates of the chain.

3. An apparatus according to claim 1 wherein said indices are constituted by projecting portions, provided on two selected ones of said pins.

* * * * *